United States Patent
Chen (10) Patent No.: US 9,094,617 B2
(45) Date of Patent: Jul. 28, 2015

(54) METHODS AND SYSTEMS FOR REAL-TIME IMAGE-CAPTURE FEEDBACK

(75) Inventor: Lawrence Shao-hsien Chen, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 806 days.

(21) Appl. No.: 13/078,052

(22) Filed: Apr. 1, 2011

(65) Prior Publication Data

US 2012/0249837 A1 Oct. 4, 2012

(51) Int. Cl.
*H04N 5/262* (2006.01)
*H04N 1/00* (2006.01)

(52) U.S. Cl.
CPC .................................. *H04N 5/2625* (2013.01)

(58) Field of Classification Search
CPC ........................ H04N 1/00458; H04N 1/00408
USPC ............. 348/333.01, 333.02, 333.04, 333.11, 348/333.12
See application file for complete search history.

(56) References Cited

U.S. PATENT DOCUMENTS

| | | | |
|---|---|---|---|
| 7,023,483 B2 | 4/2006 | Pollard et al. | |
| 7,181,061 B2 | 2/2007 | Kawano et al. | |
| 7,593,605 B2 | 9/2009 | King et al. | |
| 7,639,897 B2 | 12/2009 | Gennetten et al. | |
| 7,640,037 B2 | 12/2009 | Mutz et al. | |
| 7,698,392 B2 | 4/2010 | Zapata et al. | |
| 7,735,731 B2 | 6/2010 | Skaaksrud et al. | |
| 7,742,073 B1 | 6/2010 | Cohen-Solal et al. | |
| 7,742,953 B2 | 6/2010 | King et al. | |
| 7,773,120 B2 | 8/2010 | Simon | |
| 7,986,346 B2 | 7/2011 | Kaneda et al. | |
| 8,249,382 B2 | 8/2012 | Teshima et al. | |
| 2003/0152263 A1 | 8/2003 | Kawano et al. | |
| 2004/0125220 A1 | 7/2004 | Fukuda et al. | |
| 2005/0024517 A1 | 2/2005 | Luciano | |
| 2006/0103731 A1 | 5/2006 | Pilu et al. | |
| 2006/0221198 A1* | 10/2006 | Fry et al. ..................... | 348/222.1 |
| 2007/0172151 A1 | 7/2007 | Gennetten et al. | |
| 2007/0212040 A1 | 9/2007 | Kosako | |
| 2007/0273750 A1 | 11/2007 | Tanaka | |
| 2008/0254827 A1 | 10/2008 | Hunter | |

(Continued)

FOREIGN PATENT DOCUMENTS

| | | |
|---|---|---|
| EP | 1503581 A2 | 2/2005 |
| GB | 2386278 A | 9/2003 |

(Continued)

OTHER PUBLICATIONS

Japanese Office Action—Patent Application No. 2012-070181—Mailing Date: Dec. 4, 2012.

(Continued)

*Primary Examiner* — Mekonnen Dagnew
(74) *Attorney, Agent, or Firm* — Kristine Elizabeth Matthews; David C. Ripma (57) ABSTRACT

Aspects of the present invention are related to systems and methods for providing real-time feed-back cues in an image acquisition process. An overlaid preview-frame image may be rendered comprising cues associated with acquisition factors. A cue may indicate whether, or not, an acquisition-factor value falls within a range of acceptable values. Image features may be extracted, from a preview-frame image, and interpreted to determine acquisition-factor values and their acceptability.

25 Claims, 4 Drawing Sheets

(56) References Cited

U.S. PATENT DOCUMENTS

| | | |
|---|---|---|
| 2009/0183085 A1 | 7/2009 | Pasetto et al. |
| 2009/0202169 A1 | 8/2009 | Hayashi |
| 2009/0247219 A1 | 10/2009 | Lin et al. |
| 2009/0300068 A1 | 12/2009 | Tang |
| 2010/0054605 A1 | 3/2010 | Molnar et al. |
| 2010/0128131 A1 | 5/2010 | Tenchio et al. |
| 2010/0296583 A1 | 11/2010 | Li |
| 2010/0316295 A1* | 12/2010 | Morimoto ............ 382/182 |
| 2011/0074966 A1* | 3/2011 | Cerosaletti et al. ....... 348/222.1 |
| 2011/0161862 A1 | 6/2011 | Hibi et al. |
| 2011/0193978 A1 | 8/2011 | Wu et al. |
| 2011/0206249 A1 | 8/2011 | Mathew |
| 2011/0255762 A1 | 10/2011 | Deischinger et al. |
| 2012/0026378 A1* | 2/2012 | Pang et al. ............ 348/333.02 |
| 2012/0086792 A1 | 4/2012 | Akbarzadeh et al. |
| 2012/0148125 A1 | 6/2012 | Dekel |

FOREIGN PATENT DOCUMENTS

| | | |
|---|---|---|
| GB | 2399184 A | 9/2004 |
| GB | 2419488 A | 4/2006 |
| JP | 2001-326837 A | 11/2001 |
| JP | 2005-006255 A | 1/2005 |
| JP | 2007-243384 A | 9/2007 |
| WO | 02/37179 A2 | 5/2002 |

OTHER PUBLICATIONS

USPTO Office Action—U.S. Appl. No. 13/078,070—Notification Date Aug. 20, 2012.

USPTO Office Action—U.S. Appl. No. 13/078,070—Notification Date Mar. 12, 2013.

* cited by examiner

METHODS AND SYSTEMS FOR REAL-TIME IMAGE-CAPTURE FEEDBACK

FIELD OF THE INVENTION

Embodiments of the present invention relate generally to the area of image acquisition and, in particular, to methods and systems for providing real-time capture cues to assist in the acquisition of an image.

BACKGROUND

With the proliferation of digital cameras and camera-equipped mobile devices, a user may capture an image, referred to as a document image, of a document or of an object displaying document-like content, for example, a sign, a whiteboard, a poster, a projected slide and other objects displaying document-like content. The captured document image may be provided as input to a traditional, document-processing workflow, for example, printing, optical character recognition (OCR), compression, archival and other document processing workflow processes. However, unlike a document image obtained using a scanner, a camera-captured document image may be of limited usefulness due to the negative impact of some acquisition factors, for example, poor lighting, excessive tilt of the camera sensor plane with respect to the document, the distance from the camera to the document and other acquisition factors which may negatively impact document-image acquisition. Although many image artifacts introduced in the image acquisition process may be corrected by post-processing of the acquired image, a captured image of excessively poor quality may make it difficult, or impossible, to recover useful information, even with post-processing. Methods, systems and apparatus for providing real-time image-capture cues to assist a user in acquiring an image of sufficient, or better, quality to be useful may be desirable.

SUMMARY

Some embodiments of the present invention comprise methods and systems for providing real-time feed-back cues in an image acquisition process. According to a first aspect of the present invention, an overlaid preview-frame image may be rendered comprising cues associated with acquisition factors. According to a second aspect of the present invention, a cue may indicate whether, or not, an acquisition-factor value falls within a range of acceptable values. According to a third aspect of the present invention, image features may be extracted, from a preview-frame image, and interpreted to determine acquisition-factor values and their acceptability.

The foregoing and other objectives, features and advantages of the invention will be more readily understood upon consideration of the following detailed description of the invention taken in conjunction with the accompanying drawings.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention, but it is merely representative of the presently preferred embodiments of the invention.

Elements of embodiments of the present invention may be embodied in hardware, firmware and/or a computer program product comprising a computer-readable storage medium having instructions stored thereon/in which may be used to program a computing system. While exemplary embodiments revealed herein may only describe one of these forms, it is to be understood that one skilled in the art would be able to effectuate these elements in any of these forms while resting within the scope of the present invention.

With the proliferation of digital cameras and camera-equipped mobile devices, a user may capture an image, referred to as a document image, of a document or of an object displaying document-like content, for example, a sign, a whiteboard, a poster, a projected slide and other objects displaying document-like content. The captured document image may be provided as input to a traditional, document-processing workflow, for example, printing, optical character recognition (OCR), compression, archival and other document processing workflow processes. However, unlike a document image obtained using a scanner, a camera-captured document image may be of limited usefulness due to the negative impact of some acquisition factors, for example, poor lighting, excessive tilt of the camera sensor plane with respect to the document, the distance from the camera to the document and other acquisition factors which may negatively impact document-image acquisition. Although many image artifacts introduced in the image acquisition process may be corrected by post-processing of the acquired image, a captured image of excessively poor quality may make it difficult, or impossible, to recover useful information, even with post-processing. Methods, systems and apparatus for providing real-time image-capture cues to assist a user in acquiring an image of sufficient, or better, quality to be useful may be desirable.

In some embodiments of the present invention, one, or more, image frames in a camera's preview stream may be processed to extract image features, for example, document edges, overall exposure and other image features. Cues to assist a user in image acquisition, referred to as capture cues, may be determined from the extracted image features, and the cues may be displayed on the camera display to provide real-time feed-back to the user. Exemplary cues may be related to document edges, exposure, document size, camera tilt and other image-acquisition factors.

Figure 1:
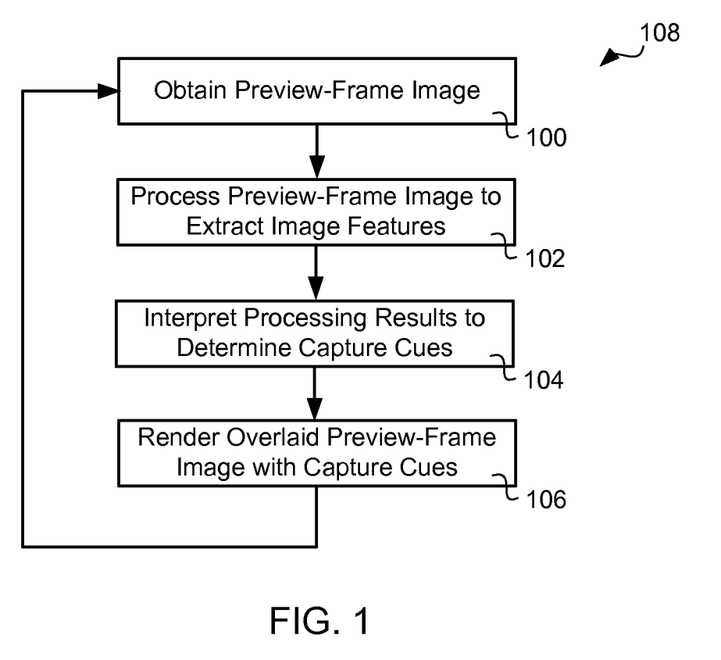
FIG. 1 is a chart showing exemplary embodiments of the present invention comprising obtaining a preview-frame image, from an image-acquisition device, and processing the preview-frame image to extract image features, the interpretation of which may determine captures cues, and an overlaid preview-frame image may be rendered with one, or more, of the determined capture cues overlaid on the original preview-frame image.

Some embodiments of the present invention may be understood in relation to FIG. 1. In these embodiments, a preview-frame image may be obtained 100, from an image-acquisition device, and processed 102 to extract image features. The results of the processing may be interpreted 104 to determine captures cues, and an overlaid preview-frame image may be rendered 106 with one, or more, of the determined capture cues overlaid on the original preview-frame image. Subsequent preview-frame images may be obtained 100, and the processing loop 108 may continue. The overlaid preview-frame image may be displayed on a display on the image-acquisition device.

Figure 2:
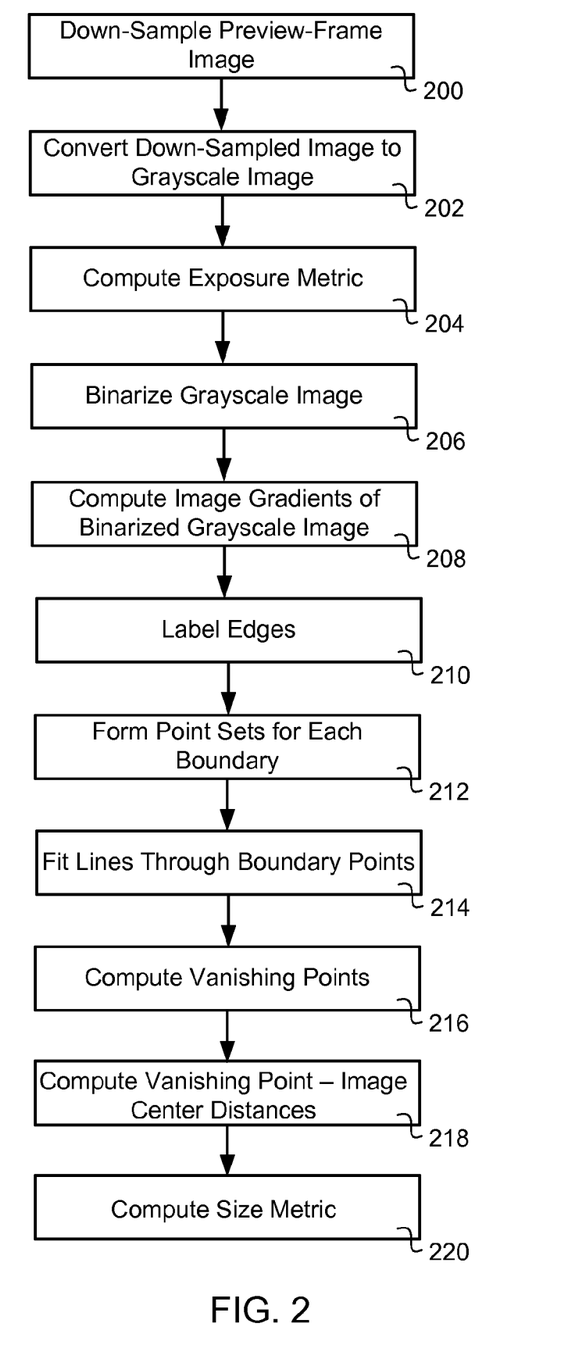
FIG. 2 is a chart showing exemplary embodiments of the present invention comprising extraction of image features, for example, an exposure metric, a size metric and a tilt metric.

In some embodiments of the present invention described in relation to FIG. 2, processing 102 of the preview-frame image may comprise down-sampling 200 of the preview-frame image. For example, a Google G1 smart phone running the Android operating system produces native preview-frame images at a resolution of 480×320 pixels, and in some embodiments of the present invention, a native preview-frame image may be down-sampled 200 to 240×160 pixels. The down-sampled image may be converted 202 to a grayscale image, and a exposure metric may be computed 204 from the grayscale image. In some embodiments of the present invention, the exposure metric, which may be denoted S, may be computed 204 according to:

$$S = \sum_x \sum_y I(x, y),$$

where $$\sum_x$$

denotes a summation in the x-direction, $$\sum_y$$

denotes a summation in the y-direction and I(x, y) denotes the grayscale image value at pixel location (x, y). In alternative embodiments, an exposure metric may be determined by histogram analysis for detection of severe over-exposure and severe under-exposure.

The grayscale image may be binarized 206. In some embodiments of the present invention, a binary image, denoted A(x, y), may be produced according to:

$$A(x, y) = \begin{cases} 1 & \text{if } I(x, y) > t \\ 0 & \text{otherwise} \end{cases},$$

where t is a threshold and pixels in A(x, y) with a value of 1 may correspond to a document region. In some embodiments of the present invention, t=100.

An image gradient in the x-direction and an image gradient in the y-direction may be computed 208 from the binarized image, A(x, y). In some embodiments of the present invention, the image gradients may be computed by convolving 3×3 Sobel operators with the binarized image according to:

$$G_x = \begin{bmatrix} 1 & 0 & -1 \\ 2 & 0 & -2 \\ 1 & 0 & -1 \end{bmatrix} * A \text{ and } G_y = \begin{bmatrix} 1 & 2 & 1 \\ 0 & 0 & 0 \\ -1 & -2 & -1 \end{bmatrix} * A,$$

where $G_x$ and $G_y$ denote the vertical and horizontal gradient images, respectively, and A denotes the matrix corresponding to the binarized image, A(x, y).

The vertical edges and the horizontal edges may be labeled 210. In some embodiments of the present invention, a pixel location may be labeled a vertical edge if the value of $G_x$ corresponding to the pixel location is greater than the value of $G_y$ corresponding to the pixel location, for example, $G_x(x, y) > G_y(x, y)$. If $G_x(x, y) < G_y(x, y)$, then the pixel location may be labeled a horizontal edge. In some embodiments of the present invention, the edge information may be stored in a label image.

Point sets may be formed 212 for a top boundary, a bottom boundary, a left boundary and a right boundary. In some embodiments of the present invention, the label image may be searched horizontally, horizontal-line-by-horizontal-line, from left to right. The pixel coordinates of the first vertical edge encountered in a horizontal line may be added to the left-boundary point set, and the pixel coordinates of the last vertical edge encountered in a horizontal line may be added to the right-boundary point set. In some embodiments of the present invention, the label image may be searched vertically, vertical-line-by-vertical-line, from top to bottom. The pixel coordinates of the first horizontal edge encountered in a vertical line may be added to the top-boundary point set, and the pixel coordinates of the last horizontal edge encountered in a vertical line may be added to the bottom-boundary point set.

A boundary line may be fit 214 through each of the boundary point sets, thereby identifying a left-boundary line, a right-boundary line, a top-boundary line and a bottom-boundary line. In some embodiments of the present invention, the boundary lines may be fit 214 to the boundary point sets using a least-squares line fitting procedure.

A horizontal vanishing point and a vertical vanishing point may be computed 216. The horizontal vanishing point may be computed 216 by determining the intersection of the top-boundary line and the bottom-boundary line. The vertical vanishing point may be computed 216 by determining the intersection of the left-boundary line and the right-boundary line. The distance between the horizontal vanishing point and the center of the image may be computed 218, and the distance between the vertical vanishing point and the center of the image may be computed 218.

A size metric may be computed 220. In some embodiments of the present invention, the size metric may be determined by counting the number of pixels in the binary image, A(x, y), that have value 1, and dividing this number by the total number of pixels in the binary image, thereby obtaining a size parameter as a percentage.

In alternative embodiments of the present invention, a preview-frame image may not be down-sampled prior to grayscale conversion.

In alternative embodiments of the present invention, a down-sampled preview-frame may not require grayscale conversion, for example, when the native image format of an image-acquisition device is a grayscale image format.

In alternative embodiments of the present invention, a preview-frame image may not be down-sampled or require grayscale conversion.

In alternative embodiments of the present invention, a contrast metric may be calculated. In some of these embodiments, the contrast metric may be determined by histogram analysis.

In alternative embodiments of the present invention, a camera motion may be measured through sensor information, for example, from accelerometers and other sensors.

In alternative embodiments of the present invention, a blur metric may be measured. In some of these embodiments, the blur metric may be determined directly from the image according to any of the blur-measurement techniques known in the art. In alternative embodiments, the blur metric may be determined from a measurement of the camera motion.

Referring again to FIG. 1, after processing 102 the preview-frame image to extract image features, the results of the processing may be interpreted 104 to determine capture cues.

In some embodiments of the present invention, the results of the image processing may be interpreted 104 to determine whether, or not, the exposure of the image is satisfactory. In some embodiments, an exposure metric, as calculated, for example, as described in relation to FIG. 2, may be compared to a predetermined exposure threshold to determine whether, or not, the exposure is satisfactory. In some embodiments, the predetermined exposure threshold may be 1,500,000, and the exposure may be deemed satisfactory when the exposure metric is greater than the exposure threshold. In alternative embodiments, an adaptive exposure threshold may be used.

In some embodiments of the present invention, the results of the image processing may be interpreted 104 to determine whether, or not, the size of the document region is satisfactory. In some embodiments, the size metric may be compared to a size threshold to determine whether, or not, the size of the document region is satisfactory. In some embodiments of the present invention, the size of the document region needs to be at least 50% of the image area to be satisfactory.

Figure 3:
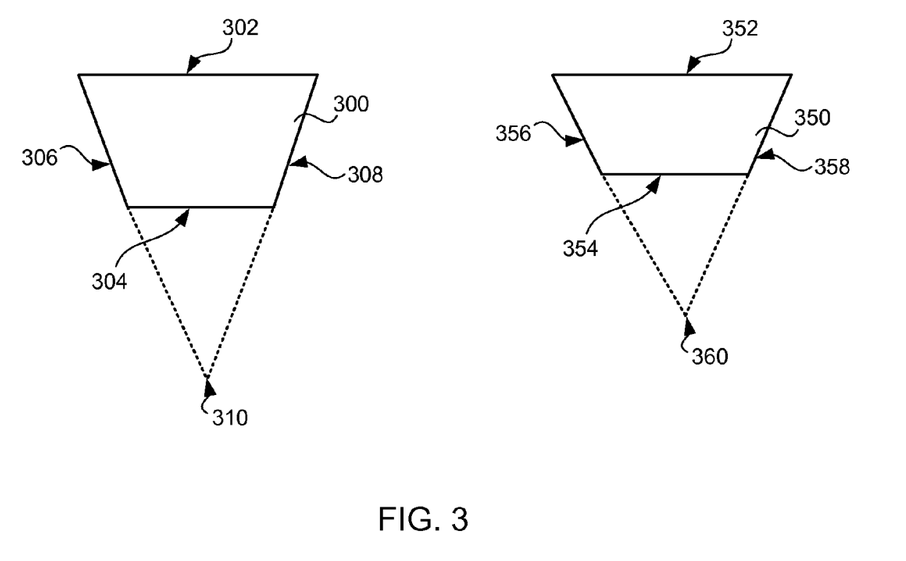
FIG. 3 is a picture illustrating the relationship between a vanishing point and a degree of tilt.

In some embodiments of the present invention, the results of the image processing may be interpreted 104 to determine whether, or not, the camera tilt with respect to the document is satisfactory. When the camera sensor plane is parallel to the document plane, the angle between the optical axis of the camera and the surface normal of the document is zero. Thus, the opposing boundaries of the document will appear to be substantially parallel in the image. As the angle between the optical axis of the camera and the surface normal of the document increases, the opposing edge lines will become increasingly less parallel and will intersect at a vanishing point that is increasingly close to the center of the image. FIG. 3 illustrates this phenomenon.

FIG. 3 depicts a first perspective projection 300, of a rectangular shape, associated with a first camera position. The first region 300 is bounded by a top-boundary line 302, a bottom-boundary line 304, a left-boundary line 306 and a right-boundary line 308. The left-boundary line 306 and the right-boundary line 308 intersect at a first vanishing point 310. FIG. 3 also depicts a second perspective projection 350, of the same rectangular shape, associated with a second camera position. The second camera position is associated with greater camera tilt than the first camera position. The second region 350 is bounded by a top-boundary line 352, a bottom-boundary line 354, a left-boundary line 356 and a right-boundary line 358. The left-boundary line 356 and the right-boundary line 358 intersect at a second vanishing point 360. The left-boundary line 306 and the right-boundary line 308 of the first perspective projection 300 are closer to parallel than the left-boundary line 356 and the right-boundary line 358 of the second perspective projection 350, and the distance from the first vanishing point 310 to the center of the image is correspondingly further than the distance from the second vanishing point 360 to the center of the image. Thus, the location of a vanishing point may correlate to the amount of camera tilt.

In some embodiments of the present invention, the locations of vanishing points associated with acceptable tilt limits, for example +/−30 degrees in each of the horizontal and vertical directions, may be determined. In some embodiments a location of a vanishing point associated with a tilt limit may be computationally determined. In alternative embodiments, the location of a vanishing point associated with a tilt limit may be determined empirically. The distance from a vanishing point associated with a tilt limit to the center of the image may be used as a threshold for determining whether, or not, the determined camera tilt is acceptable. In some embodiments of the present invention, a horizontal-distance threshold for the distance between the horizontal vanishing point and the center of the image may be 500 pixels, and a vertical-distance threshold for the distance between the vertical vanishing point and the center of the image may be 600 pixels. The camera tilt may be considered acceptable when $d(Van_H, center) > TV_H$, where $d(Van_H, center)$ is the distance between the horizontal vanishing point, $Van_H$, and the image center, center, and $TV_H$ is the horizontal-distance threshold associated with the horizontal tilt limit and when $d(Van_V, center) > TV_V$, where $d(Van_V, center)$ is the distance between the horizontal vanishing point, $Van_V$, and the image center, center, and $TV_V$ is the vertical-distance threshold associated with the vertical tilt limit.

Referring to FIG. 1, in some embodiments of the present invention, an overlaid preview-frame image may be rendered 106 showing the capture cues. In some embodiments of the present invention, the boundary lines, top, bottom, left and right, may be superimposed on the preview-frame image.

In some embodiments of the present invention, the acceptability of an acquisition-factor value may be indicated on the overlaid preview-frame image iconically. In an exemplary embodiment, a green star may be displayed in proximity to a factor label to indicate that the acquisition-factor value falls within acceptable limits for satisfactory image capture. While an orange star may be displayed in proximity to the factor label to indicate that the acquisition-factor value does not fall within acceptable limits for satisfactory image capture. In alternative embodiments of the present invention, the acceptability of an acquisition-factor value may be indicated on the overlaid preview-frame image textually. In an exemplary embodiment, the text strings "GOOD" and "NO GOOD" may be displayed in proximity to a factor label to indicate that the acquisition-factor value falls or does not fall within acceptable limits, respectively. In some embodiments, the text string may comprise a color attribute further indicative of the acceptability of the acquisition-factor value. For example, the text string "GOOD" may be rendered in green, while the text string "NO GOOD" may be rendered in red. In still alternative embodiments of the present invention, the acceptability of an acquisition-factor value may be indicated on the overlaid preview-frame image iconically and textually.

Figure 4:
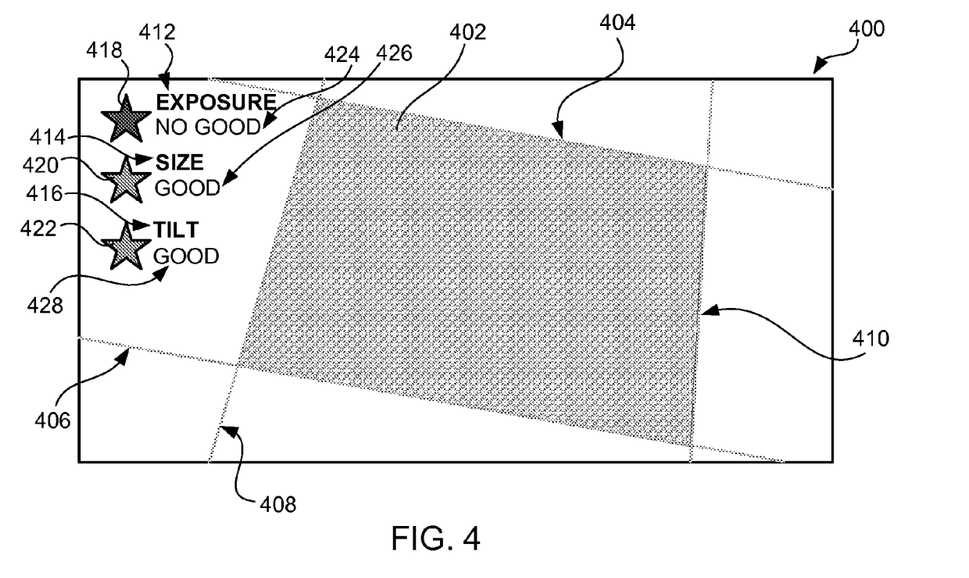
FIG. 4 is a picture depicting an exemplary rendering of an overlaid preview-frame image comprising acquisition cues.

An exemplary overlaid preview-frame image is depicted in FIG. 4. FIG. 4 shows a camera preview display 400. A text region 402, shown in cross-hatch, has been detected, and boundary lines 404, 406, 408, 410 have been superimposed on the preview-frame image. Additionally, capture cues have been overlaid on the preview-frame image. In particular, cues are displayed for three acquisition factors: "EXPOSURE,"

"SIZE" and "TILT," which are indicated by corresponding factor labels 412, 414, 416, respectively. In proximity to each factor label 412, 414, 416 is an iconic indicator, 418, 420, 422, respectively, and a textual indicator, 424, 426, 428, respectively, of the acceptability of the acquisition-factor values. An exposure acquisition-factor value, "EXPOSURE," has been determined to fall outside of the acceptable limits, and the user is cued to this by an icon 418 of a color associated with unsatisfactory and a text string 424 indicating that the "EXPOSURE" value is "NO GOOD." A size acquisition-factor value, "SIZE," has been determined to fall within the acceptable limits, and the user is cued to this by an icon 420 of a color associated with satisfactory and a text string 426 indicating that the "SIZE" value is "GOOD." A tilt acquisition-factor value, "TILT," has been determined to fall within the acceptable limits, and the user is cued to this by an icon 422 of a color associated with satisfactory and a text string 428 indicating that the "TILT" value is "GOOD."

Figure 5:
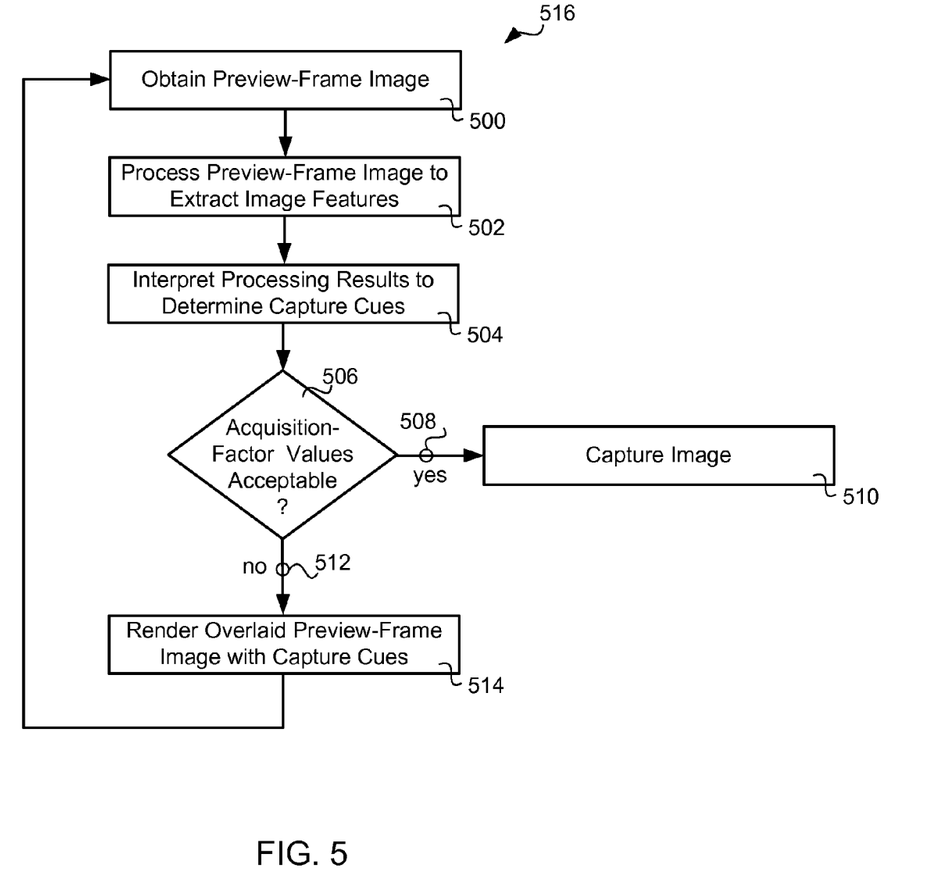
FIG. 5 is a chart showing exemplary embodiments of the present invention comprising obtaining a preview-frame image, from an image-acquisition device, and processing the preview-frame image to extract image features, the interpretation of which may determine captures cues, and an overlaid preview-frame image may be rendered with one, or more, of the determined capture cues overlaid on the original preview-frame image unless acquisition-factor values are all satisfactory, wherein an image may be automatically captured.

In some embodiments of the present invention described in relation to FIG. 5, a camera may be set to capture an image automatically when all of the acquisition-factor values fall with their respective acceptable range. In these embodiments, a preview-frame image may be obtained 500 and processed 502 to extract image features. The results of the processing may be interpreted 504 to determine captures cues. The acquisition-factor values determined in the interpretation of the processing results may be examined 506, and if all of the acquisition-factor values fall 508 within their respective acceptable range, then the camera may capture 510 the image. If one, or more, of the acquisition-factor values are not acceptable 512, then an overlaid preview-frame image may be rendered 514 with one, or more, of the determined capture cues overlaid on the original preview-frame image. Subsequent preview-frame images may be obtained 500, and the processing loop 516 may continue. Automatic image capture may eliminate inadvertent camera shake when a user presses the shutter or taps on the device screen to capture the image.

Although exemplary embodiments of the present invention have been described for certain image acquisition factors, it is to be understood that other image acquisition factors, for example, contrast, camera motion, blur and other factors may be employed within the scope of the present invention.

Although the charts and diagrams in the figures may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that software, hardware and/or firmware may be created by one of ordinary skill in the art to carry out the various logical functions described herein.

Some embodiments of the present invention may comprise a computer program product comprising a computer-readable storage medium having instructions stored thereon/in which may be used to program a computing system to perform any of the features and methods described herein. Exemplary computer-readable storage media may include, but are not limited to, flash memory devices, disk storage media, for example, floppy disks, optical disks, magneto-optical disks, Digital Versatile Discs (DVDs), Compact Discs (CDs), micro-drives and other disk storage media, Read-Only Memory (ROMs), Programmable Read-Only Memory (PROMs), Erasable Programmable Read-Only Memory (EPROMS), Electrically Erasable Programmable Read-Only Memory (EEPROMs), Random-Access Memory (RAMS), Video Random-Access Memory (VRAMs), Dynamic Random-Access Memory (DRAMs) and any type of media or device suitable for storing instructions and/or data.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for image acquisition, said method comprising:
    obtaining a preview-frame image;
    extracting a first image feature from said preview-frame image, wherein said extracting said first image feature comprises:
        determining a top-boundary line of a document region;
        determining a bottom-boundary line of said document region;
        determining a left-boundary line of said document region;
        determining a right-boundary line of said document region;
        determining a horizontal vanishing point;
        determining a vertical vanishing point;
        determining a first distance between said horizontal vanishing point and a center point associated with the center of said preview-frame image; and
        determining a second distance between said vertical vanishing point and said center point;
    interpreting said first image feature in relation to a first acquisition factor; and
    rendering an overlaid preview-frame image comprising a first cue associated with said first acquisition feature.

2. A method as described in claim 1, wherein said first acquisition factor is a tilt factor.

3. A method as described in claim 1 further comprising:
    extracting a second image feature from said preview-frame image;
    interpreting said second image feature in relation to a second acquisition factor; and
    rendering said overlaid preview-frame image to further comprise a second cue associated with said second acquisition feature.

4. A method as described in claim 3, wherein:
    said second acquisition factor is a factor selected from the group consisting of exposure, size, contrast, camera motion and blur.

5. A method as described in claim 3 further comprising:
    extracting a third image feature from said preview-frame image;
    interpreting said third image feature in relation to a third acquisition factor; and
    rendering said overlaid preview-frame image to further comprise a third cue associated with said third acquisition feature.

6. A method as described in claim 5, wherein:
    said third acquisition factor is a factor selected from the group consisting of exposure, size, contrast, camera motion and blur; and
    said third acquisition factor is not said second acquisition factor.

7. A method as described in claim 3, wherein said extracting a second image feature comprises computing an exposure metric.

8. A method as described in claim 7, wherein said interpreting said second image feature in relation to a second acquisition factor comprises:
    comparing said computed exposure metric to an exposure threshold;
    when said comparing meets a first criterion, rendering said second cue to indicate a satisfactory exposure value; and
    when said comparing does not meet said first criterion, rendering said second cue to indicate an unsatisfactory exposure value.

9. A method as described in claim 3, wherein said extracting a second image features comprises computing a size metric.

10. A method as described in claim 9, wherein said computing a size metric comprises:
    down-sampling said preview-frame image;
    converting said down-sampled preview-frame image to a grayscale image;
    binarizing said grayscale image;
    determining a first number of pixels in said binarized image associated with a document region; and
    dividing said first number of pixels by a total number of pixels in said binarized image.

11. A method as described in claim 10, wherein said interpreting said second image feature in relation to a second acquisition factor comprises:
    comparing said computed size metric to a size threshold;
    when said comparing meets a first criterion, rendering said second cue to indicate a satisfactory size value; and
    when said comparing does not meet said first criterion, rendering said second cue to indicate an unsatisfactory size value.

12. A method as described in claim 1, wherein said interpreting said first image feature in relation to a first acquisition factor comprises:
    comparing said first distance to a horizontal-distance threshold;
    comparing said second distance to a vertical-distance threshold;
    when said comparing said first distance to said horizontal-distance threshold meets a first criterion and said comparing said second distance to said vertical-distance threshold meets a second criterion, rendering said first cue to indicate a satisfactory tilt value; and
    when said comparing said first distance to said horizontal-distance threshold does not meet a first criterion or said comparing said second distance to said vertical-distance threshold does not meet a second criterion, rendering said first cue to indicate an unsatisfactory tilt value.

13. A method as described in claim 1 further comprising:
    down-sampling said preview-frame image;
    converting said down-sampled preview-frame image to a grayscale image;
    binarizing said grayscale image;
    computing a horizontal gradient image from said binarized image;
    computing a vertical gradient image from said binarized image;
    labeling a plurality of vertical edges based on said horizontal gradient image and said vertical gradient image;
    labeling a plurality of horizontal edges based on said horizontal gradient image and said vertical gradient image;
    forming a top-boundary point set from said labeled edges;
    forming a bottom-boundary point set from said labeled edges;
    forming a left-boundary point set from said labeled edges;
    forming a right-boundary point set from said labeled edges;
    fitting a first line to said top-boundary point set, wherein said top-boundary line is said first line;
    fitting a second line to said bottom-boundary point set, wherein said bottom-boundary line is said second line;
    fitting a third line to said left-boundary point set, wherein said left-boundary line is said third line; and
    fitting a fourth line to said right-boundary point set, wherein said left-boundary line is said fourth line.

14. A method as described in claim 13, wherein:
    determining said horizontal vanishing point comprises determining the intersection of said top-boundary line and said bottom-boundary line; and
    determining said vertical vanishing point comprises determining the intersection of said left-boundary line and said right-boundary line.

15. A method as described in claim 13, wherein:
    said overlaid preview-frame image comprises said top-boundary line overlaid on said preview-frame image;
    said overlaid preview-frame image comprises said bottom-boundary line overlaid on said preview-frame image;
    said overlaid preview-frame image comprises said left-boundary line overlaid on said preview-frame image; and
    said overlaid preview-frame image comprises said right-boundary line overlaid on said preview-frame image.

16. A method as described in claim 1, wherein:
    determining said horizontal vanishing point comprises determining the intersection of said top-boundary line and said bottom-boundary line; and
    determining said vertical vanishing point comprises determining the intersection of said left-boundary line and said right-boundary line.

17. A method as described in claim 1, wherein said first cue comprises an icon.

18. A method as described in claim 17, wherein:
    said icon comprises a first color when said first cue indicates a satisfactory value; and
    said icon comprises a second color when said first cue indicates an unsatisfactory value.

19. A method as described in claim 1, wherein said first cue comprises a text string.

20. A method as described in claim 19, wherein:
    said text string comprises a first color when said first cue indicates a satisfactory value; and
    said text string comprises a second color when said first cue indicates an unsatisfactory value.

21. A method as described in claim 1, wherein said first cue comprises an icon and a text string.

22. A method as described in claim 1, further comprising acquiring a first image when a first acquisition-factor value associated with said first acquisition factor is satisfactory.

23. A method as described in claim 1, further comprising displaying said overlaid preview-frame image on an image-acquisition device associated with said preview-frame image.

24. A method for image acquisition, said method comprising:
    obtaining a preview-frame image;
    extracting a plurality of image features from said preview-frame image, wherein said extracting said plurality of image feature from said preview-frame image comprises:
        determining a top-boundary line of a document region;
        determining a bottom-boundary line of said document region;

determining a left-boundary line of said document region;
determining a right-boundary line of said document region;
determining a horizontal vanishing point;
determining a vertical vanishing point;
determining a first distance between said horizontal vanishing point and a center point associated with the center of said preview-frame image; and
determining a second distance between said vertical vanishing point and said center point;
interpreting said plurality of image features in relation to a plurality of acquisition factors, thereby determining an acquisition-factor value for each of said acquisition factors in said plurality of acquisition factors;
determining, for each of said acquisition-factor values, if said acquisition-factor value is satisfactory;
when each of said acquisition-factor values is satisfactory, acquiring a first image; and
when, at least one of said acquisition-factor values is not satisfactory, rendering an overlaid preview-frame image comprising a plurality of cues associated with said acquisition-factor values.

25. A method as described in claim 24, further comprising displaying said overlaid preview-frame image on an image-acquisition device associated with said preview-frame image.

* * * * *